United States Patent [19]
Ikeda

[11] Patent Number: 6,111,606
[45] Date of Patent: Aug. 29, 2000

[54] SIGNAL PROCESSOR FOR AMPLIFYING PICTURE SIGNALS, AND SAMPLING AND HOLDING THE AMPLIFIED PICTURE SIGNALS

[75] Inventor: Chikaho Ikeda, Nakai-machi, Japan

[73] Assignee: Fuji Xerox Co., Ltd., Tokyo, Japan

[21] Appl. No.: 08/668,474

[22] Filed: Jun. 25, 1996

[30] Foreign Application Priority Data

Jul. 12, 1995 [JP] Japan ................................. 7-200523

[51] Int. Cl.⁷ ................................................ H04N 5/217
[52] U.S. Cl. ........................ 348/241; 327/552; 341/122
[58] Field of Search .................................. 348/241, 243, 348/248, 249, 250, 251, 294, 295; 327/552, 553, 555, 558, 551, 560, 561, 91, 93, 94, 95, 96; 341/122, 123, 124, 125; H04N 5/217

[56] References Cited

U.S. PATENT DOCUMENTS

| | | | |
|---|---|---|---|
| 4,599,640 | 7/1986 | Dischert | 348/241 |
| 4,677,490 | 6/1987 | Levine | 348/241 |
| 4,845,382 | 7/1989 | Eouzan et al. | 348/243 |
| 5,463,346 | 10/1995 | Brooks | 327/553 |
| 5,708,376 | 1/1998 | Ikeda | 327/50 |

FOREIGN PATENT DOCUMENTS

| | | |
|---|---|---|
| 62-135775 | 6/1987 | Japan . |
| 62-185458 | 8/1987 | Japan . |
| 3-295362 | 12/1991 | Japan . |

*Primary Examiner*—Tuan Ho
*Attorney, Agent, or Firm*—Oliff & Berridge, PLC

[57] ABSTRACT

A signal processor amplifies picture signals provided by an image sensor, samples the amplified picture signals and holds the samples of the amplified picture signals. The signal processor comprises a dual correlation sampling circuit, and a sample-and-hold circuit connected to the output part of the dual correlation sampling circuit. The dual correlation sampling circuit comprises an amplifying stage to which an input signal is given, a low-pass filter connected to the output part of the amplifying stage, a time constant changing switch to be closed to set the low-pass filter for a smaller time constant, and a switch driving means for closing the time constant changing switch after the completion of giving an input signal to the amplifying stage.

14 Claims, 9 Drawing Sheets

SIGNAL PROCESSOR FOR AMPLIFYING PICTURE SIGNALS, AND SAMPLING AND HOLDING THE AMPLIFIED PICTURE SIGNALS

BACKGROUND OF THE INVENTION

1. Field of the Invention

The present invention relates to a signal processor for amplifying picture signals provided by an image sensor, and sampling and holding the amplified picture signals.

2. Description of the Related Art

Figure 6:
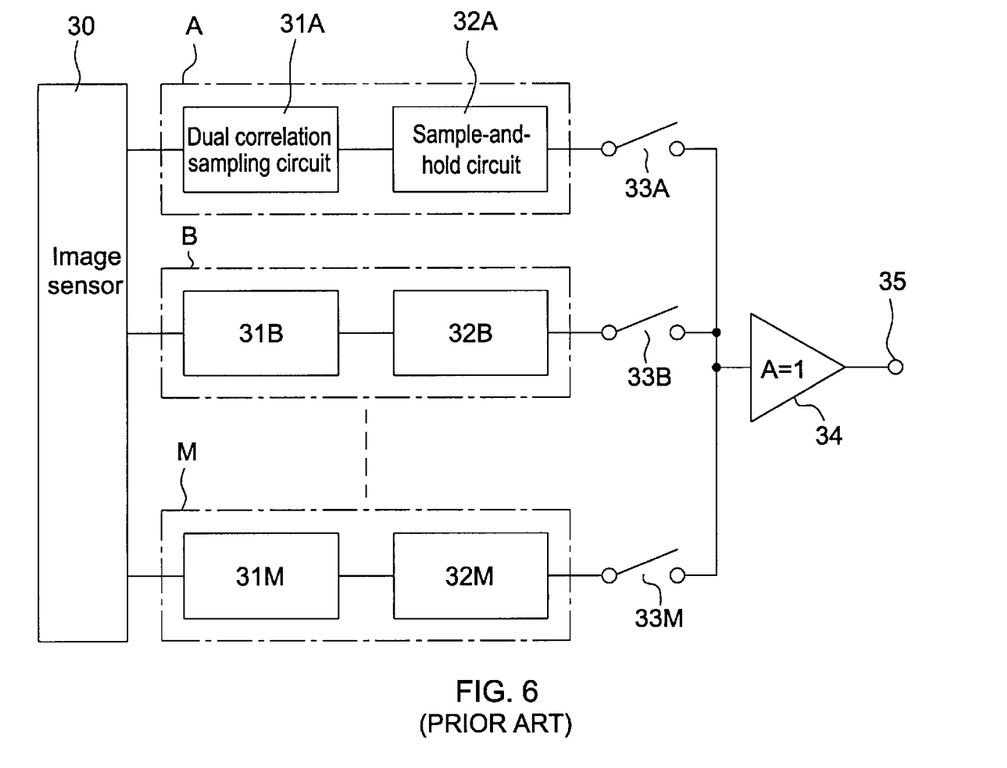
FIG. 6 is a block diagram of a picture signal processor that provides a time series of data representing a plurality of picture signals provided by an image sensor.

Referring to FIG. 6 showing a picture signal processor for reading, in a time series, a plurality of picture signals produced by an image sensor, there are shown an image sensor 30, dual correlation sampling circuits 31A to 31M, sample-and-hold circuits 32A to 32M, switches 33A to 33M, a buffer 34, an output terminal 35, and signal processing channels A to M respectively for picture signals.

An input bias voltage of an input parasitic capacitance, not shown, or the like is applied to the dual correlation sampling circuits 31A to 31M before applying picture signals provided by the image sensor 30. When a picture signal is superposed on the input bias voltage, the dual correlation sampling circuits 31A to 31M amplify only the picture signal and provides an amplified picture signal. The sample-and-hold circuits 32A to 32M holds the outputs of the dual correlation sampling circuits 31A to 31M, respectively.

Since the respective operations of the signal processing channels A to M are similar to each other, the operation of the signal processing channel A will be described by way of example. The dual correlation sampling circuit 31A amplifies a picture signal (input signal) produced by one of the picture reading elements of the image sensor 30, and the sample hold circuit 32A holds the amplified picture signal provided by the dual correlation sampling circuit 31A. Thus, the sample-and-hold circuits 32A to 32M of the signal processing channels A to M holds the amplified picture signals obtained by amplifying the output picture signals of the picture reading elements of the image sensor 30. The switches 33A to 33M are closed sequentially to send out the amplified picture signals through the buffer 34 to the output terminal 35, so that a time series of the amplified picture signals is obtained.

It is desired that the amplified picture signals of the time series are provided continuously with the shortest possible idle period. If there is an idle period between the successive amplified picture signals, the dual correlation sampling circuits 31A to 31M must be controlled so as not to read the next data, which requires a complex control operation, and clock frequency must be increased during an output period, requiring the widening of the frequency band of the buffer.

When sending out the data continuously, problems arise in the sample-and-hold circuits. The sample-and-hold circuit is unable to hold the next data while the same is sending out the previously held data. Therefore, when one control signal is used to control the sample holding operations of the signal processing channels, the output operation must be interrupted during the sampling operation. A technique proposed to avoid the interruption of the output operation during the sampling operation duplicates the sample-and-hold circuit of each signal processing channel. A dual correlation sampling circuit and a sample-and-hold circuit will be described hereinafter.

[Double Correlation Sampling Circuit]

Figure 2:
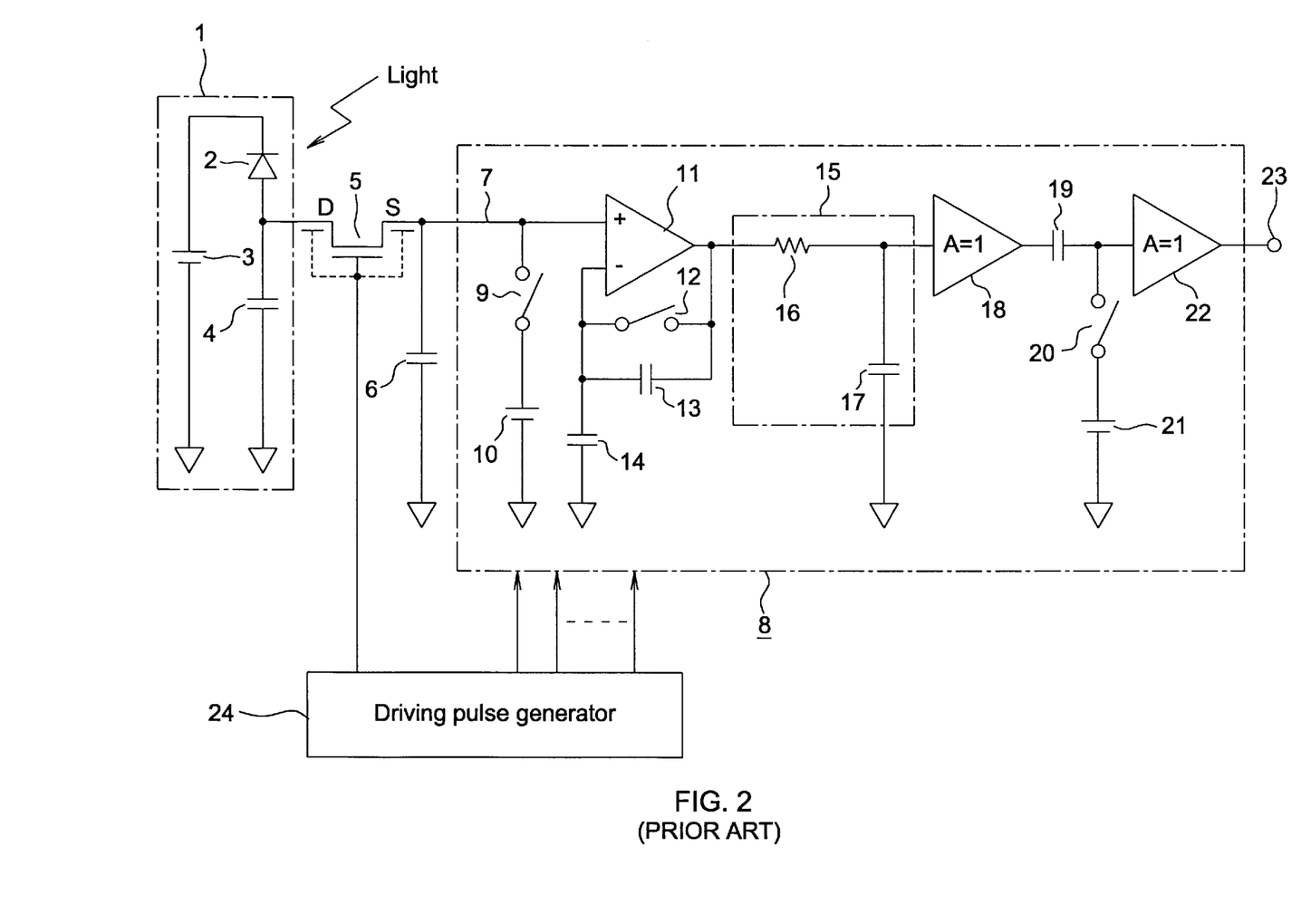
FIG. 2 is a circuit diagram of an example of a conventional dual correlation sampling circuit.

FIG. 2 shows an example of a conventional dual correlation sampling circuit. Shown in FIG. 2 are an image sensor 1, one of a plurality of photodiodes 2, a bias power supply 3, a capacitance 4, a thin-film transistor (TFT) 5, a capacitance 6, an input signal line 7, a dual correlation sampling circuit 8, a reset switch 9, an input bias power supply 10, an operational amplifier 11, a switch 12, capacitors 13 and 14, a low-pass filter 15, a resistor 16, a capacitor 17, a buffer 18, a dc regenerating capacitor 19, a switch 20, an output reference power supply 21, a buffer 22, an output terminal 23 and a driving pulse generator 24.

Each photodiode 2 of the image sensor 1 has a cathode connected to the positive terminal of the bias power supply 3, and an anode connected to the drain of the TFT 5. The photodiode 2 detects incident light. The capacitor 4 connected to the anode of the photodiode 2 represents the sum of the capacitance of the photodiode and the drain parasitic capacitance of the TFT 5. As indicated by dotted lines, the TFT 5 has small capacitances between the gate and the drain D and between the gate and the source S due to the overlap of the drain D and the source S with the gate. The capacitance 6 represents the sum of the source parasitic capacitance of the TFT 5 and the input capacitance of the dual correlation sampling circuit 8 of an IC configuration.

The switches included in the dual correlation sampling circuit 8, i.e., an IC, are analog switches. The driving pulse generator 24 generates a pulse signal for turning on and off the TFT 5 and the switches. The input bias power supply 10 is connected through the reset switch 9 to the input signal line 7. A negative feedback circuit comprising the switch 12 and the capacitor 13 is connected to the operational amplifier 11. The operational amplifier 11 functions as a buffer (gain is $10^0$) when the switch 12 is closed, and functions as an amplifier at a gain dependent on the capacitance ratio between the capacitors 14 and 13 when the switch 12 is opened. The negative feedback circuit is of a dual system to enable the operational amplifier 11 to carry out dual correlation sampling.

First, an input bias voltage is applied to the operational amplifier 11 of the dual correlation sampling circuit 8 for the first sampling, and then, a composite signal produced by superposing a picture signal on the input bias voltage is applied to the dual correlation sampling circuit 8 for the second sampling. The difference between the input bias voltage and the composite signal is amplified, (1) Application of Input Bias Voltage The reset switch 9 is closed for a fixed period with the TFT 5 turned off. Then, the capacitance 6 is charged by the input bias power supply 10 at an input bias voltage $V_{10}$. The operational amplifier 11 functions as a buffer when the switch 12 is closed after opening the reset switch 9, and provides an output voltage equal to the sum of the input voltage $V_{10}$ and the offset of the operational amplifier 11. The capacitor 14 of an inverting input terminal is charged to the same voltage by the negative feedback. When the offset of the operational amplifier 11 is negligibly small as compared with the input bias voltage $V_{10}$, the voltage of the charged capacitor 14 is equal to the input bias voltage $V_{10}$.

The output voltage $V_{10}$ of the operational amplifier 11 is applied through the low-pass filter 15 and the buffer 18 to the dc regenerating capacitor 19. In this state the switch 20 is closed and the output voltage $V_{21}$ of the output reference power supply 21 is applied to the dc regenerating capacitor 19 in the reverse direction. Then, dc regenerating capacitor 19 is charged at a voltage equal to $(V_{10}-V_{21})$. Then, the switch 20 is opened.

The low-pass filter 15 reduces noise. Generally, the design cutoff frequency of an amplifier has a margin because the cutoff frequency is somewhat affected by process errors introduced into the amplifier during manufacture and the parasitic capacitance thereof. Therefore, the amplifier amplifies noise of frequencies outside a necessary frequency band. The low-pass filter 15 eliminates such noise. The buffer 18 increases impedance on the input side with respect to the low-pass filter 15, and reduces impedance on the output side with respect to the dc regenerating capacitor 19. Without the buffer 18, the dc regenerating capacitor 19 is a load on the low-pass filter 15 and may possibly lower the cutoff frequency of the low-pass filter 15 and narrow the frequency band.

(2) Application of Input Bias Voltage and Input Signal

The photodiode 2 produces a current approximately proportional to the total illumination and charges the capacitance 4, which generates a picture signal $\Delta V$. When the TFT 5 is turned on, the sum of the voltage $V_{10}$ and the picture signal $\Delta V$ is applied to the operational amplifier 11. When the gain $A_{11}$ of the operational amplifier 11 is, for example, $10^2$, the output voltage of the operational amplifier 11 is: $V_{10}+100 \Delta V$. The output voltage of the operational amplifier 11 is applied through the low-pass filter 15 and the buffer 18 to the dc regenerating capacitor 19. Since the dc regenerating capacitor 19 has been charged at a voltage of $(V_{10}-V_{21})$, the remainder of subtraction of the voltage $(V_{10}-V_{21})$ from the voltage $(V_{10}+100 \Delta V)$ is applied to the input terminal of the buffer 22.

$$(V_{10}+100 \Delta V)-(V_{10}-V_{21})=100 \Delta V+V_{21}$$

Consequently, a voltage of $(100 \Delta V+V_{21})$ appears at the output terminal 23.

Figure 3:
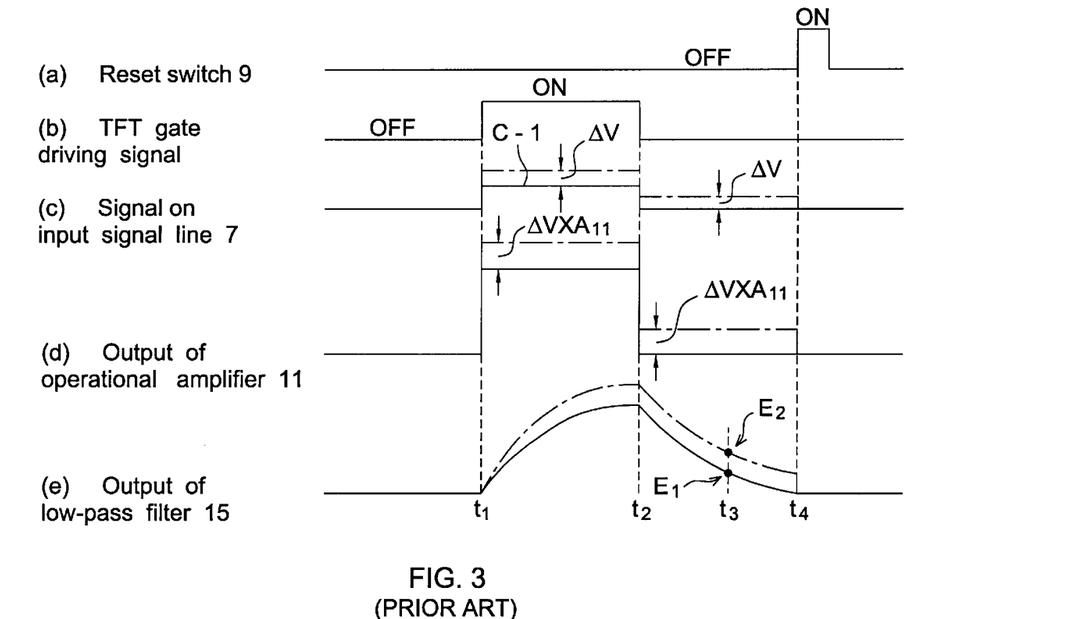
FIG. 3 is a time chart of assistance in explaining the operation of a conventional dual correlation sampling circuit.

FIG. 3 is a time chart of assistance in explaining the operation of the picture signal processor, in which curves of solid lines indicate the waveforms of signals in a dark state, i.e., a state where there is no incident radiant flux on the image sensor 1, and curves of long and short dash lines indicate the waveforms of signals in an illuminated state where there is some incident radiant flux on the image sensor 1.

(1) Period $t_1$ to $t_2$

When a TFT gate driving signal goes HIGH at time $t_1$ as shown in (b) of FIG. 3, feed-through, i.e., leakage of a gate signal into the drain or the source, occurs and, consequently, the voltage of the capacitance 6 is increased by the leakage signal (charge) accordingly, which is represented by an increase in the input signal applied to the operational amplifier 11 to a section C-1 at time $t_1$ in (c) of FIG. 3. Although such an increase in the input signal applied to the operational amplifier 11 in a dark state is due to only the feed-through voltage, the input signal $\Delta V$ is added to the feed-through voltage and the input signal applied to the operational amplifier 11 increases to a level indicated by alternate long and short dash line in (c) of FIG. 3 in an illuminated state.

The operational amplifier 11 amplifies the input voltage including the feed-through voltage as represented by a curve in (d) of FIG. 3 and gives an amplified input voltage to the low-pass filter 15. Then, the output of the low-pass filter 15 increases at a time constant toward the output of the operational amplifier 11 as shown in (e) of FIG. 3.

(2) Period $t_2$ to $t_4$

When the TFT gate driving signal goes LOW at time $t_2$ as shown in (b) of FIG. 3, the same quantity of charge as that leaked into the capacitance 6 when the TFT gate driving signal went HIGH leaks out from the capacitance 6 and, consequently, the potential of the input signal line 7 drops by a voltage corresponding to the leakage charge (feed-through voltage) and the level of the output of the operational amplifier is lowered accordingly. The output of the low-pass filter 15 decreases toward the output of the operational amplifier 11 at a time constant from the high value including the amplified feed-through voltage.

The output of the dual correlation sampling circuit 8 is transferred through the output terminal 23 (FIG. 2) to a sample-and-hold circuit, not shown, and is held by the sample-and-hold circuit. A value corresponding to an output $E_1$ is obtained in the dark state and a value corresponding to an output $E_2$ is obtained in the illuminated state by sampling in a time period $t_3$ between times $t_2$ and $t_4$.

(3) Time $t_4$

The input on the input signal line 7 is reset when the reset switch 9 is closed at time $t_4$.

[Sample-hold Circuit]

Figure 8:
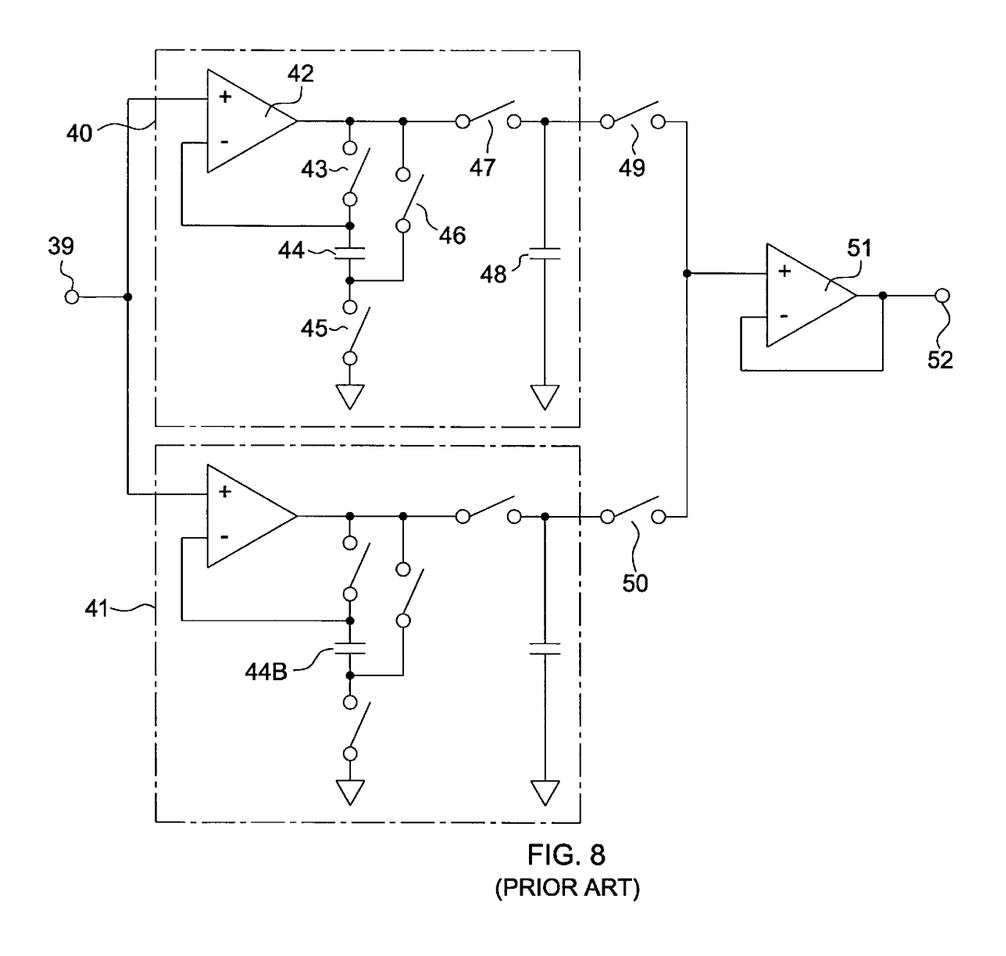
FIG. 8 is a circuit diagram of a conventional dual sample-and-hold circuit.

FIG. 8 shows a conventional dual sample-and-hold circuit. Shown in FIG. 8 are a first sample-and-hold circuit 40, a second sample-and-hold circuit 41, operational amplifiers 42, a switch 43, capacitors 44 and 44B, switches 45 and 46, switches 47, capacitors 48, switches 49 and 50, an operational amplifier 51 and an output terminal 52. The switches are analog switches, such as MOSFETs.

The inverting input terminal (−) of the operational amplifier 42 is connected through the switch 43 to the output terminal of the operational amplifier 42, and through the capacitor 44 and the switch 45 to a ground of a fixed potential(earth). The junction of the capacitor 44 and the switch 45 is connected through the switch 46 to the output terminal of the operational amplifier 42. The output terminal of the operational amplifier 42 is connected through the switch 47 to the capacitor 48 for holding samples, and the junction of the operational amplifier 42 and the capacitor 48 is connected through the switch 49 to the input terminal of the operational amplifier 51. The inverting input terminal (−) of the operational amplifier 51 is connected to the output terminal of the same for buffer action. The configuration of the second sample-and-hold circuit 41 is the same as that of the first sample-and-hold circuit 40.

The operation of the first sample-and-hold circuit 40 will be described hereinafter. The output of a dual correlation sampling circuit is applied to the input terminal 39. The switches 43 and 45 are closed and the switches 46, 47 and 49 are opened when an input bias voltage is applied to the input signal line 7 of the dual correlation sampling circuit. Then, negative feedback of 100% is made for the operational amplifier 42 and the operational amplifier 42 functions as a buffer. Suppose that the input bias voltage is $V_i$ and the offset voltage of the operational amplifier 42 is $V_{i0}$. Then, a voltage equal to $(V_i+V_{i0})$ applied to the noninverting input terminal (+) appears at the output terminal of the operational amplifier 42 and the capacitor 44 is charged at the voltage $(V_i+V_{i0})$.

When the output $V_s$ of the dual correlation sampling circuit provided when a picture signal is given to the dual correlation sampling circuit is superposed on the voltage $V_i$ of the input terminal 39 with the switches 43 and 45 open, the switches 46 and 47 closed and the switch 49 open, the voltage at the input terminal 39 is equal to $(V_s+V_i)$. When the operational amplifier 42 provides an output voltage $V_{42}$ in this state, a voltage equal to $(V_{42}+V_i+V_{i0})$ is applied to the inverting input terminal (−). The operational amplifier 42 operates so as to meet a condition expressed by:

$$(V_s+V_i)-(V_{42}+V_i+V_{i0})=-V_{i0}$$

Therefore, $V_{42}=V_s$. the capacitor 48 is charged at the input signal $V_s$ for sampling and holding when the switch 47 is closed.

The data thus held is transferred through the operational amplifier 51 to the output terminal 52 when the switch 49 is closed. While the first sample-and-hold circuit 40 is in an output operation, the second sample-and-hold circuit 41 may be operated to hold the next data.

Known picture signal processors are disclosed in, for example, Japanese Patent Laid-Open Nos. Sho 62-185458 (1987) and Sho 62-135775(1987).

The prior art described above has the following problems.

First, the dual correlation sampling circuit of FIG. 2, when operating at a high operating speed, is unable to provide correct outputs.

Secondly, the dual correlation sampling circuit of FIG. 2 has a large circuit scale and consumes much power because the two buffers connected to the output of the low-pass filter are necessary.

Thirdly, when the two sample-and-hold circuits are employed in a dual arrangement and the respective voltages of the two charged capacitors 44 and 44B for cancelling the offset voltage of the operational amplifier are different from each other, the output levels differ from each other due to the difference in voltage between the two capacitors 44 and 44B in spite of same input voltage applied to both sample-and-hold circuits and the difference translates into periodic noise.

The first problem: The output $E_1$ ($E_2$) sampled in the time period $t_3$, in which the output of the low-pass filter is decreasing at the time constant, is greater than a correct value to be properly sampled, i.e., a value at the termination of the decrease. Although the correct value can be sampled if the output of the low-pass filter is sampled at the termination of the decrease, such a mode of sampling reduces the operating speed.

A technique relating to the low-pass filter and the sample-and-hold circuit of apparatus relating to picture reading are proposed in Japanese Patent Laid-Open No. Hei 3-295362 (1991). This technique reduces the time constant of a low-pass filter when a light source is turned on (when the apparatus is started) and increases the time constant when reading a document. Thus, the previously proposed technique is different from the present invention in the object of application.

The second problem; As shown in FIG. 2, the two buffers 18 and 22 are arranged behind the low-pass filter 15. Many circuit elements are necessary to form the two buffers 18 and 22, and the circuit elements require high power and consume much power. Since buffers deteriorate the linearity of signals and generate noise, the use of the two buffers is disadvantageous.

The third problem: The circuit shown in FIG. 8 has the two sample-and-hold circuits for one and the same image sensor, and input signals are given alternately to the two sample-and-hold circuits. The capacitors 44 and 44B are provided for cancelling the offsets of the operational amplifiers. However, these capacitors are unable to cancel the offsets perfectly due to parasitic capacitances, not shown. If voltages not cancelled by the two sample-and-hold circuits are different from each other, the difference between the voltages not cancelled affects the alternate outputs generating periodic noise.

SUMMARY OF THE INVENTION

The present invention has been made to solve such problems in the prior art.

According to a first aspect of the present invention, a signal processor comprises: a dual correlation sampling circuit; and a sample-and-hold circuit connected to the output part of the dual correlation sampling circuit; wherein the dual correlation sampling circuit comprises an amplifying stage to which an input signal is given, a low-pass filter connected to the output part of the amplifying stage, a time constant changing switch to be closed to set the low-pass filter for a smaller time constant, and a switch driving means for closing the time constant changing switch after the completion of giving an input signal to the amplifying stage.

According to a second aspect of the present invention, a signal processor comprises; a dual correlation sampling circuit; and a sample-and-hold circuit connected to the output part of the dual correlation sampling circuit; wherein the dual correlation sampling circuit comprises an amplifying stage to which an input signal is given, an input bias voltage application switch that connects a bias voltage source to and disconnect the same from the input part of the amplifying stage to which an input signal is given, a low-pass filter connected to the output part of the amplifying stage and comprising a resistor and a capacitor, a cutoff switch interposed between the resistor and the capacitor of the low-pass filter to connect the resistor to and disconnect the same from the capacitor, a dc regenerating capacitor having one terminal connected to the junction of the resistor and the cutoff switch, a reference power supply connecting switch connected to the other terminal of the dc regenerating capacitor and a output reference power supply, and a switch driving means for driving the switches so that the output reference power supply connecting switch is closed to connect the output reference power supply to the dc regenerating capacitor and the cutoff switch is opened to disconnect the resistor from the capacitor when the input bias voltage is applied to the amplifying stage for a first sampling cycle, and the output reference power supply connecting switch is opened and the cutoff switch is closed when a composite signal produced by superposing the input bias voltage and a picture signal is applied to the amplifying stage for a second sampling operation.

In the signal processor according to the second aspect of the present invention, the switch driving means may drive the switches so that the cutoff switch is closed after the output reference power supply connecting switch has been opened, the reset switch is operated for resetting before the input bias voltage is applied to the amplifying stage, both the cutoff switch and the output reference power supply connecting switch are kept open while an input is applied to the amplifying stage.

According to a third aspect of the present invention, a signal processor comprises: a first operational amplifier having a first input terminal to which an input signal is applied and a second input terminal; a first switch for connecting the first input terminal of the first operational amplifier to and disconnecting the same from a reference power supply; a second switch for connecting the second input terminal of the first operational amplifier to and disconnecting the same from the output terminal of the first operational amplifier; a first capacitor having one electrode connected to the second input terminal of the operational amplifier and the other electrode connected to the output reference power supply; a third switch interposed between the first capacitor and the output reference power supply; and a plurality of sample-and-hold main circuits each comprising a sample-and-hold capacitor and a buffer having an input terminal connected to the sample-and-hold capacitor; wherein sample-and-hold main circuit selector switches connect, when selected, the output terminal of the first operational amplifier to the sample-and-hold capacitors of the plurality of sample-and-hold main circuits, respectively, and negative feedback switches connect the output terminals of the associated sample-and-hold main circuits to the junction of the first capacitor and the third switch, respectively, when the associated sample-and-hold main circuits are selected by the sample-and-hold main circuit selector switch.

In the signal processor according to the third aspect of the present invention, a second capacitor may be connected to the output terminal of the operational amplifier, and the junction of the first capacitor and the third switch.

The signal processor according to the third aspect of the present invention may further comprise a switch driving means for opening the second switch first when opening all the first, the second and the third switch in a closed state.

The operating speed of the signal processor comprising the dual correlation sampling circuit and the sample-and-hold circuit connected to the output part of the dual correlation sampling circuit can be raised by setting the low-pass filter included in the dual correlation sampling circuit for a smaller time constant by the time constant changing switch after the input has been received.

The buffer connected across the low-pass filter and the dc regenerating capacitor can be omitted to reduce the scale of the circuit and to reduce power consumption by using the dc regenerating capacitor included in the dual correlation sampling circuit as the component capacitor of the low-pass filter when applying an offset voltage cancelling dc voltage.

When forming a dual sample-and-hold circuit, one operational amplifier having an offset voltage cancelling capacitor is disposed on the input part, and two sample-and-hold main circuits each having a sample-and-hold capacitor or the like are arranged in a parallel connection. The output of each sample-and-hold main circuit is fed back through the offset voltage cancelling capacitor to the input part of the sample-and-hold main circuit. The two sample-and-hold main circuits are used alternately. Since the same offset voltage cancelling capacitor is used for cancelling the offset voltage for either sample-and-hold main circuit, periodic noise attributable to the difference in voltage between two capacitors is not generated.

BRIEF DESCRIPTION OF THE DRAWINGS

The above and other objects, features and advantages of the present invention will become more apparent form the following description taken in connection with the accompanying drawings, in which.

DESCRIPTION OF THE PREFERRED EMBODIMENTS

[First Embodiment]

Figure 1:
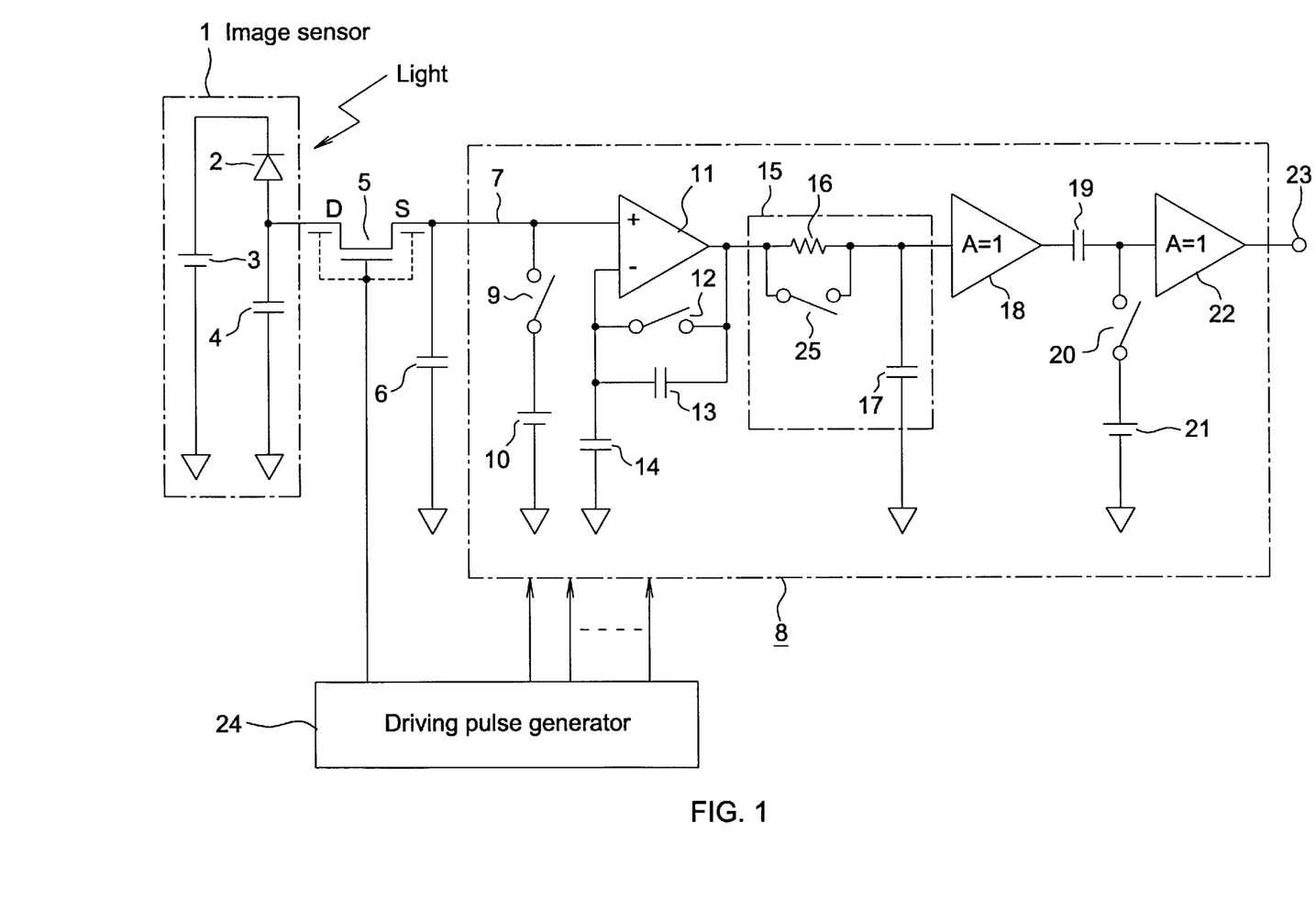
FIG. 1 is a circuit diagram of a dual correlation sampling circuit in Example 1 included in a signal processor in a preferred embodiment according to the present invention.

FIG. 1 shows a dual correlation sampling circuit 8 in Example 1 included in a signal processor in a preferred embodiment according to the present invention, in which parts like or corresponding to those shown in FIG. 2 are designated by the same reference characters. Referring to FIG. 1, the dual correlation sampling circuit 8 has a switch 25, which, similarly to other switches of the dual correlation sampling circuit 8, is an analog switch. This dual correlation sampling circuit 8 solves the aforesaid first problem that the dual correlation sampling circuit, when operating at a high operating speed, is unable to provide correct outputs.

The switch 25 is connected in parallel to the resistor 16 of the low-pass filter 15. The switch 25 is controlled for on-off operation by a control signal provided by the driving pulse generator 24 to change the time constant of the low-pass filter 15. The low-pass filter 15 is set for a smaller time constant when the switch 25 is closed to short-circuit the resistor 16, and for a larger time constant when the switch 25 is opened. If a plurality of resistors is used instead of the resistor 16, the switch 25 may be connected in parallel to at least one of the plurality of resistors.

The operation of the dual correlation sampling circuit of FIG. 1 will be explained with reference to the time chart shown in FIG. 4, which is similar to FIG. 3.

(1) Period $t_1$ to $t_2$

The operation of the dual correlation sampling circuit in a period $t_1$ to $t_2$ is the same as that of the conventional dual correlation sampling circuit of FIG. 3 in the same period and hence the description thereof will be omitted.

(2) Period $t_2$ to $t_4$

The TFT 5 is turned off at time $t_2$. Then, the voltage of the input signal line 7 drops by a voltage corresponding to a feed-through voltage and the output voltage of the operational amplifier 11 drops accordingly. On the other hand, the switch 25 is closed at time $t_2$ to set the low-pass filter 15 to a smaller time constant. Therefore, the output of the low-pass filter 15 can be decreased toward the output of the operational amplifier 11 at a rate higher than that shown in FIG. 3. After the output of the low-pass filter 15 has fully decreased to and stabilized at the lowest value, the switch 25 is opened. As shown in (e) of FIG. 4, a time period $T_1$ for which the switch 25 is closed is slightly longer than a time period necessary for the output of the low-pass filter 15 to decrease fully to the reduced output of the operational amplifier 11.

Figure 4:
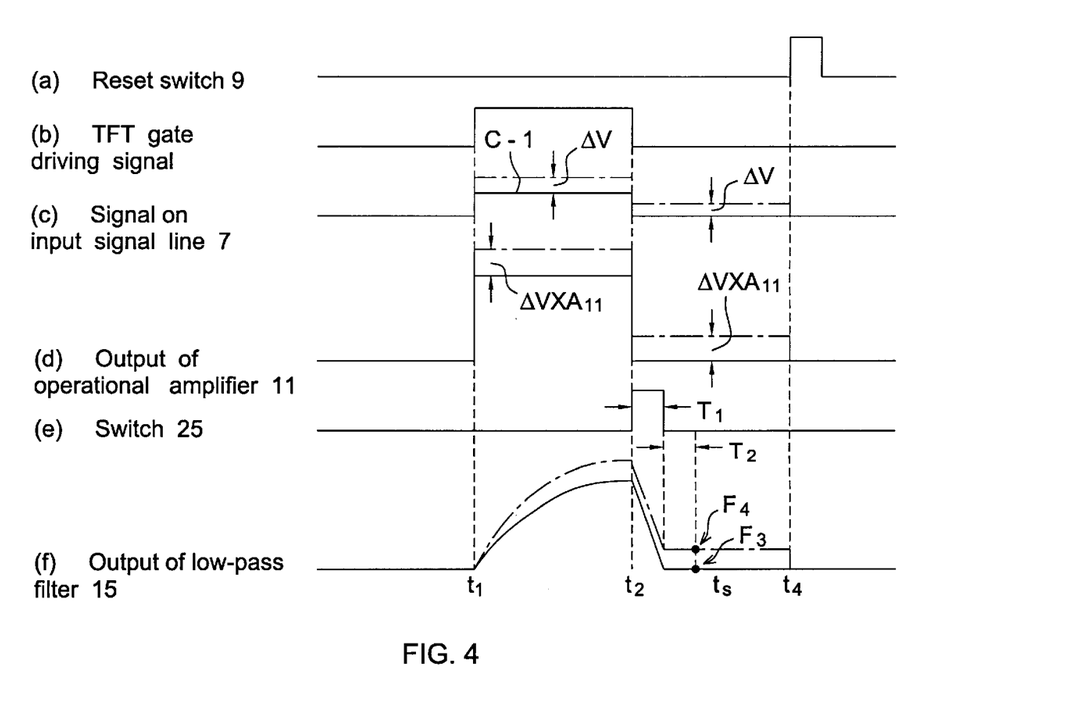
FIG. 4 is a time chart of assistance in explaining the operation of the dual correlation sampling circuit in Example 1.

In (f) of FIG. 4, $t_S$ indicates sampling time. Since the low-pass filter 15 is set for a larger time constant when the switch 25 is opened, and the larger time constant is effective for reducing noise. It is desirable to sample the output after the passage of a time corresponding to the larger time constant for the full exertion of the noise reducing effect. Therefore, a time period $T_2$ between time when the switch 25 is opened to time $t_S$ is longer than a time corresponding to the time constant.

A sample output $F_3$ in a dark state and a sample output $F_4$ in an illuminated state are obtained by the foregoing sampling operation. Since the sample outputs $F_3$ and $F_4$ are sampled after the influence of feed-through has been eliminated, i.e., after the passage of the period $T_1$, and noise has been fully reduced, i.e., after the passage of the period $T_2$, the sample outputs $F_3$ and $F_4$ are accurate values including little error. Since dual correlation sampling circuit 8 of the present invention is able to obtain accurate sample outputs by sampling the output of the low-pass filter 15 earlier than the conventional dual correlation sampling circuit, the operation of the former is faster than that of the latter.

(3) Time $t_4$

The reset switch 9 is closed at time $t_4$ to reset the input on the input signal line 7.

[Second Embodiment]

Figure 5:
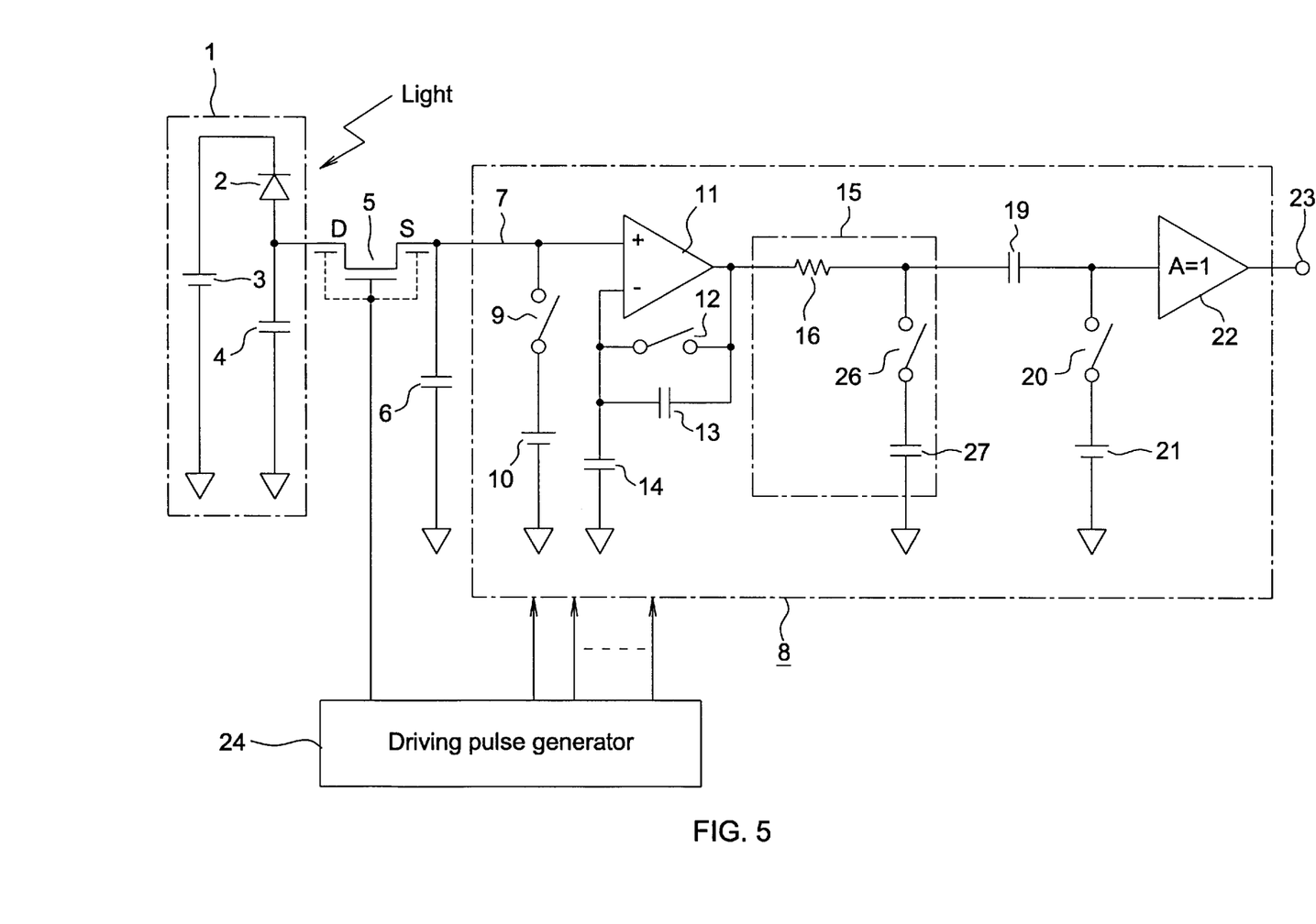
FIG. 5 is a circuit diagram of a dual correlation sampling circuit in Example 2 to be employed in a signal processor in accordance with the present invention.

FIG. 5 shows a dual correlation sampling circuit 8 included in a signal processor in a second embodiment according to the present invention, in which parts like or corresponding to those shown in FIG. 2 are designated by the same reference characters. In FIG. 5, indicated at 26 is a switch and at 27 is a capacitor. This dual correlation sampling circuit 8 solves the aforesaid second problem that the dual correlation sampling circuit of FIG. 2 having the two buffers connected to the output part of the low-pass filter has a large circuit scale and consumes much power.

In the conventional dual correlation sampling circuit of FIG. 2, the capacitor 17 is used both when the input bias voltage is applied to the operational amplifier 11 and when the composite signal produced by superposing an input signal on the input bias voltage is applied to the operational amplifier 11. Therefore, if the buffer 18 is omitted, the dc regenerating capacitor 19 functions as a capacitor that forms a low-pass filter together with the capacitor 17 when the input bias voltage is applied to the operational amplifier 11 and the cutoff frequency is changed.

The buffer 18 is necessary to eliminate the influence of the capacitance of the dc regenerating capacitor 19 on the low-pass filter 15. In the second embodiment, the switch 26 is opened to disconnect the capacitor 27 form the low-pass filter 15 when the input bias voltage is applied to the operational amplifier 11 to use the dc regenerating capacitor 19 as a component of the low-pass filter 15. Therefore, the dual correlation sampling circuit 8 in the second embodiment does not need any component corresponding to the buffer 18.

The operation of the dual correlation sampling circuit 8 of FIG. 5 will be described hereinafter.

(1) Input Bias Voltage Application

The operation for obtaining the output $V_{10}$ of the operational amplifier 11 is the same as that of the conventional dual correlation sampling circuit 8 of FIG. 2 and hence the description thereof will be omitted. When the input bias voltage is applied to the operational amplifier 11, the switch 26 is opened and the switch 20 is closed. The dc regenerating capacitor 19 serves together with the resistor 16 as a component of the low-pass filter 15 to reduce noise. The voltage across the electrodes of the dc regenerating capacitor 19 when charged is $(V_{10}-V_{21})$. After the dc regenerating capacitor 19 has been thus charged, the switch 20 is opened.

(2) Composite Signal Application

The switch 26 is closed and the switch 20 is opened, and the the resistor 16 and the capacitor 27 carry out the function of the low-pass filter 15. When the TFT 5 is turned on, a composite signal, i.e., the sum of the voltage $V_{10}$ of the capacitance 6 and a picture signal $\Delta V$, is given to the operational amplifier 11. When the gain $A_{11}$, of the operational amplifier 11 is $10^2$, the output voltage of the operational amplifier 11 is $(V_{10}+100\ \Delta V)$. The amplified output of the operational amplifier 11 is transferred to the dc regenerating capacitor 19 after reducing the noise included in the output of the operational amplifier 11 by the low-pass filter 15. The operation of the dual correlation sampling circuit 8 thereafter is the same as that of the conventional dual correlation sampling circuit of FIG. 2.

The low-pass filter 15 of the dual correlation sampling circuit 8 of the second embodiment uses one of the different capacitors when the input bias voltage is applied to the operational amplifier 11 and the other capacitor when the composite signal is applied to the operational amplifier 11 to use different cutoff frequencies. Incidentally, the input bias voltage $V_{10}$, applied to the operational amplifier 11 when the reset switch 9 is closed is substantially constant and hence the voltage of the dc regenerating capacitor 19 when charged is substantially constant. Therefore, the reduction of the time constant is not very important. From such a point of view, the capacitance of the dc regenerating capacitor 19 may be greater than that of the capacitor 27 and the dc regenerating capacitor 19 may have a large time constant to reduce random noise.

The switch 26 is closed after the switch 20 has been opened to keep the voltage $(V_{10}-V_{21})$ of the charged dc regenerating capacitor 19 unchanged. If the switch 20 is opened after the switch 26 has been closed, both the switches 20 and 26 are closed for a certain period, and a closed circuit consisting of the output reference power supply 21, the dc regenerating capacitor 19 and the capacitor 27 is formed. Consequently, the dc regenerating capacitor 19 is discharged through the closed circuit and the voltage thereof changes.

The reset switch 9 is an analog switch comprising a MOSFET. When the reset switch 9 is closed, the channel of the MOSFET functions as a resistor and generates thermal noise (kTC). Therefore, the S/N ratio is decreased greatly by the thermal noise if the reset switch 9 is closed in a period from the application of the input bias voltage to the operational amplifier 11 to the reception of the input signal. Therefore, the reset switch 9 must be closed before the input bias voltage is applied to the operational amplifier 11.

If the switch 26 or 20 is kept closed while the TFT 5 is in an on-state, the output voltage of the operational amplifier saturated by the amplification of a voltage due to feed-through charges the dc regenerating capacitor 19 and the restoration of the original voltage takes some time and high-speed operation is impossible. Therefore, it is desirable to keep both the switches 20 and 26 in an off-state while the TFT 5 is in an on-state. The input bias power supply 10 and the output reference power supply 21 may be substituted by a single power supply if conditions for operation permit.

[Third Embodiment]

Figure 9:
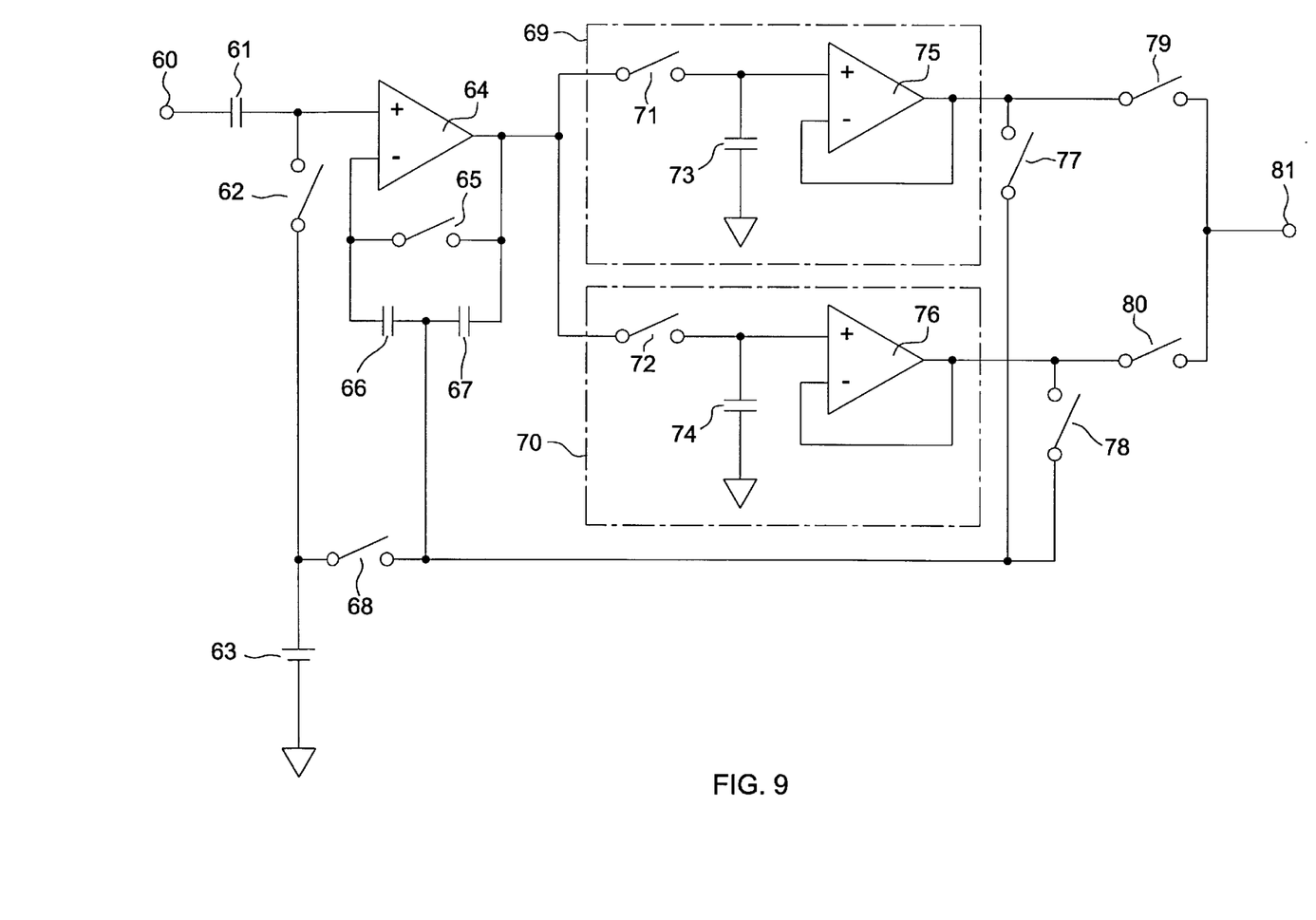
FIG. 9 is a dual sample-and-hold circuit in accordance with the present invention.

FIG. 9 shows a dual sample-and-hold circuit included in a signal processor in a third embodiment according to the present invention. Shown in FIG. 9 are an input terminal 60, a capacitor 61, a switch 62, an output reference power supply 63, an operational amplifier 64, a switch 65, capacitors 66 and 67, a switch 68, a first sample-and-hold main circuit 69, a second sample-and-hold main circuit 70, switches 71 and 72, capacitors 73 and 74, operational amplifiers 75 and 76, switches 77 to 80 and an output terminal 81.

The output reference power supply 63 is connected through the switch 62 to the noninverting input terminal of the operational amplifier 64, the switch 65 is connected across the inverting input terminal and the output terminal of the operational amplifier 64, and a series circuit of the capacitor 66 and the switch 68 is connected across the inverting input terminal of the operational amplifier 64 and the output reference power supply 63. The sample-and-hold main circuits 69 and 70 arranged in a parallel connection are connected to the output terminal of the operational amplifier 64. The sample-and-hold main circuits 69 and 70 are operated alternately. The sample-and-hold main circuit 69 (70) comprises the sample-and-hold switch 71 (72), the sample-and-hold capacitor 73 (74) and the operational amplifier 75 (76). The output terminals of the sample-and-hold main circuits 69 and 70 are connected through the switches 77 and 78, respectively, to the junction of the capacitor 66 and the switch 68 to form a negative feedback circuit.

The operational amplifier is an ordinary operational amplifier having a differential amplifying stage and an output amplifying stage. Desirably, each of the operational amplifiers 75 and 76 has only a differential amplifying stage, which will be described later.

The capacitor 61 and the output reference power supply 63 correspond to the dc regenerating capacitor 19 and the output reference power supply 21, respectively, of the sample-and-hold circuit 8 of FIG. 1. When the output voltage $V_{63}$ of the output reference power supply 63, i.e., an output reference voltage, is applied to the operational amplifier 64, the switches 62, 65 and 68 are closed. The output voltage $V_{63}$ is applied to the noninverting terminal of the operational amplifier 64, and the offset voltage of the operational amplifier 64 is applied to the capacitor 66 to charge the same. The switch 65 is opened first and the switches 62 and 68 are opened subsequently. The switch 65 is opened first to keep the voltage of the capacitor 66 equal to the offset voltage of the operational amplifier 64 unchanged.

Figure 7:
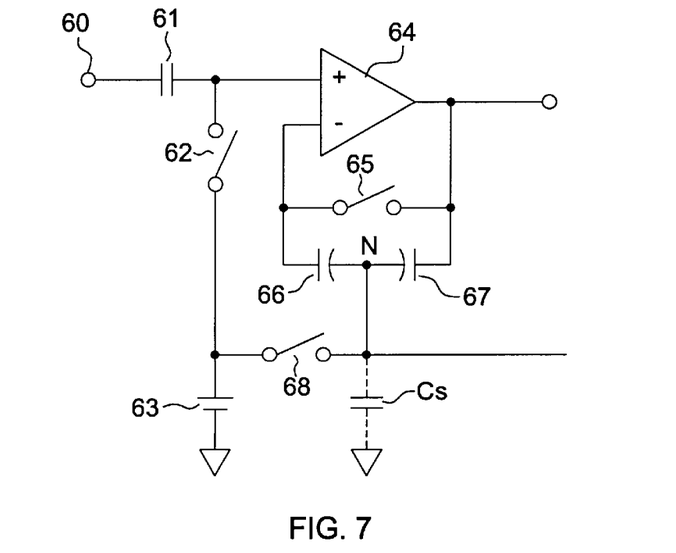
FIG. 7 is a circuit diagram of assistance in explaining the variation of the voltage of a capacitor 66 with parasitic capacitance.

FIG. 7 is a circuit diagram of assistance in explaining the dependence of the voltage of the capacitor 66 on a parasitic capacitance $C_s$. When the capacitors 66 and 67 are included in an integrated circuit, the junction N of the capacitors 66 and 67 is on a silicon substrate and hence large parasitic capacitance $C_s$ appears between the junction N and a ground of a fixed potential. The terminal of the capacitor 66 on the side of the junction N is connected to the ground by the parasitic capacitance $C_s$. The variation of the voltage of the capacitor 66 can be suppressed by suppressing the discharge of charges. Therefore, the switch is opened to connect a high impedance to the capacitor 66.

The switches 65 and 68 are connected to the opposite electrodes of the capacitor 66, respectively. If the switch 68 is opened first, one of the electrodes of the capacitor 66 is connected to the closed switch 65 and the other electrode is connected through the parasitic capacitance $C_s$, which is not a high impedance, to the ground. Consequently, the voltage of the capacitor 66 is able to change. If the switch 65 is opened first, a high impedance is connected to the electrode of the capacitor 66 connected to the inverting input terminal (–) of the operational amplifier 64 and hence the voltage of the capacitor 66 does not change.

Referring again to FIG. 9, the capacitor 73 is charged by the output of the operational amplifier 64 when the switch 71 of the first sample-and-hold main circuit 69 is closed. The switches 77 is closed when the switch 71 is closed to feed back the output of the operational amplifier 75 through the capacitor 66 to the operational amplifier 64. Since the capacitor 66 is charged at the offset voltage of the operational amplifier 64, the offset voltage is cancelled and the output of the operational amplifier 75 changes to a voltage corresponding to that of the noninverting input terminal of the operational amplifier 64. When the switches 71 and 77 are opened, the voltage of the capacitor 73 is held, and the voltage of the capacitor 73 thus held appears at the output terminal 81 when the switch 79 is closed.

The second sample-and-hold main circuit 70 performs the same operation. The output of the operational amplifier 76 is fed back through the capacitor 66 to the operational amplifier 64.

Since the first sample-and-hold main circuit 69 and the second sample-and-hold main circuit 70 are connected to the output of the same operational amplifier 64, the operations of the first sample-and-hold main circuit 69 and the second sample-and-hold main circuit 70 are not affected differently by the offset voltage.

In the circuit shown in FIG. 9, the operational amplifier 64 and the operational amplifiers 75 and 76 are arranged in cascade connections. If ordinary operational amplifiers each having two amplifying stages are arranged in a cascade connection and negative feedback is made for the cascade connection (switch 77 is closed), oscillation is liable to occur due to propagation delay. If an ordinary operational amplifier having two amplifying stages and a large gain is used at a gain of unity, a phase compensating capacitor of a large capacity is necessary. If those components are formed in an integrated circuit, the integrated circuit requires a large area and is expensive. Therefore, the operational amplifiers 75 and 76 used as buffers are those having only a differential amplifying stage. When the operational amplifiers having only a differential amplifying stage are used, propagation delay is reduced and any phase compensating capacitor of a large capacity is not necessary.

When connecting the offset voltage cancelling capacitor 66 to the operational amplifier 64, it is desirable to connect the capacitor 67 in series to the capacitor 66 so as to form a negative feedback route from the output terminal of the operational amplifier 64 to enable negative feedback through the capacitors 66 and 67 even when the switch 65 is opened or there is no any negative feedback through the switch 77 or 78. If such negative feedback is not made, the output of the operational amplifier 64 may possibly increase to a maximum, i.e., the output of the power supply for the operational amplifier 64, and the supply current may possibly vary greatly. The variation of the supply current affects adversely to other circuits connected to the operational amplifier 64 in the same integrated circuit. Such a trouble can be avoided when a negative feedback route is secured by the capacitors 66 and 67.

In the sample-and-hold circuit shown in FIG. 9, the two sample-and-hold main circuits 69 and 70 are provided with the sample-and-hold switches 71 and 72, respectively. If the difference between switching noises generated by the switches 71 and 72 is large, the alternate up and down change of the level of the output occurs when the two sample-and-hold main circuits 69 and 70 operate alternately. Therefore the switches 71 and 72, i.e., the analog switches, must be formed in the integrated circuit so that their characteristics are similar to each other as far as possible. It is desirable to form the switches 71 and 72 contiguously in the integrated circuit for such a purpose.

Figure 10:
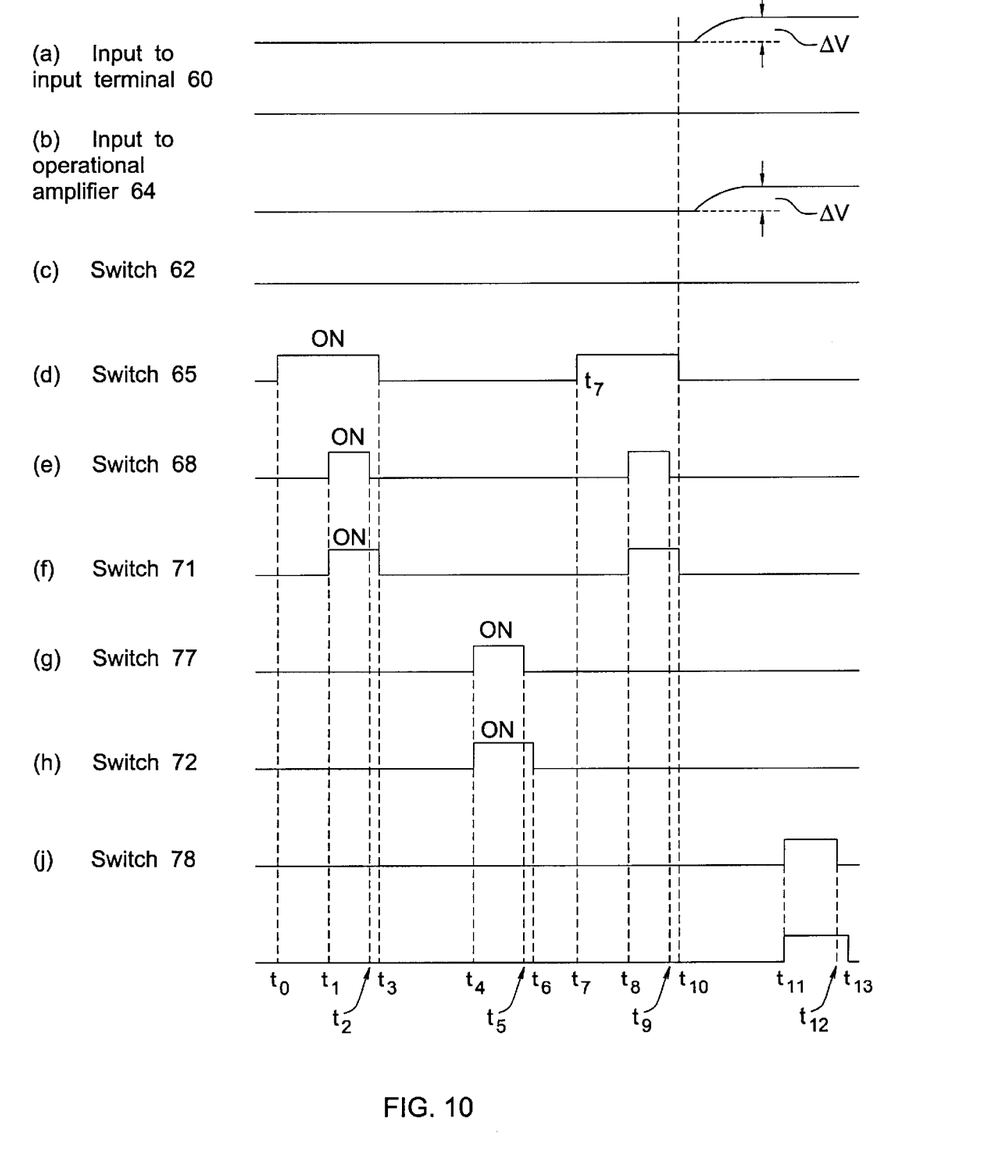
FIG. 10 is a time chart of assistance in explaining the operation of the dual sample-and-hold circuit in accordance with the present invention.

FIG. 10 is a time chart of assistance in explaining the operation of the dual sample-and-hold circuit of FIG. 9, in which time is measured on the horizontal axis, and ΔV represents the magnitude of a picture signal. In FIG. 10, (a)

indicates an input to the input terminal 60 and (b) indicates an input to the operational amplifier 64. The input signal, i.e., the picture signal, is given to the dual sample-and-hold circuit slightly after time $t_{10}$. With no input signal given to the dual sample-and-hold circuit, the switch 62 is closed at time $t_0$ to apply the supply voltage of the output reference power supply 63.

Then, the switches 65 and 68 are closed at time $t_1$ to charge the capacitor 66 at the offset voltage of the operational amplifier 64. As mentioned above, the switch 65 is opened first at time $t_2$ and the two switches 62 and 68 are opened at time $t_3$ to keep the voltage of the charged capacitor 66 unchanged.

Then, the sample-and-hold switch 71 of the first sample-and-hold main circuit 69 and the negative feedback switch 77 are closed at time $t_4$. In this state, the output of the operational amplifier 64 is held by the capacitor 73. Thus one cycle of operation is completed. Similarly, another cycle of operation is started at time $t_7$ to enter the picture signal $\Delta V$.

Figure 11:
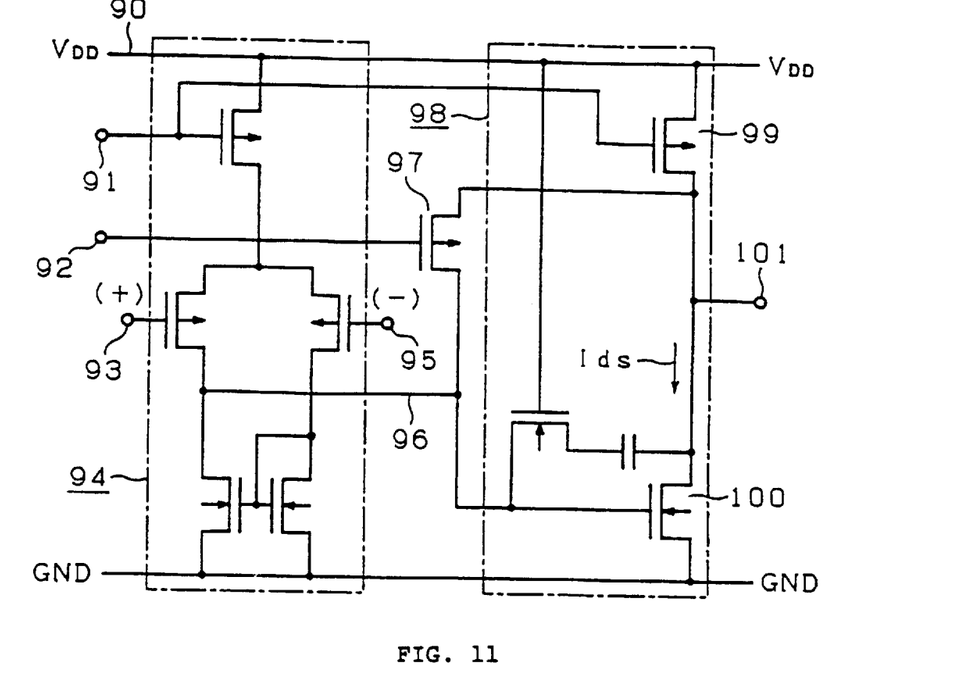
FIG. 11 is a concrete circuit diagram of a first-stage amplifier included in the dual sample-and-hold circuit of FIG. 10.

FIG. 11 is a concrete circuit diagram of the operational amplifier 64, i.e., the first-stage amplifier, of the dual sample-and-hold circuit of FIG. 9. Shown in FIG. 11 are a power line 90, a constant-current control signal input terminal 91, a clipping voltage input terminal 92, a noninverting input terminal 93, a differential amplifying stage 94, an inverting input terminal 95, an output signal line, an output clipping transistor 97, an output amplifying stage 98, output MOSFETs 99 and 100, an output terminal 101, a supply voltage $V_{DD}$ and a ground GND of a fixed potential.

The output of the differential amplifying stage 94 is transferred through the output signal line 96 to the output amplifying stage 98, and the MOSFET 100 amplifies the output of the differential amplifying stage 94 and gives its output, i.e., the output of the operational amplifier 64, to the output terminal 101. The MOSFET 99 is saturated and is supplying a constant current. The ratio between a current $I_{ds}$ that flows to the MOSFET 100 and a current that flows to the output terminal 101 varies according to the output voltage of the MOSFET 100. When the potential of the MOSFET 100 increased and the potential of the MOSFET 99 decreases to an extent that cannot maintain a saturated state, a constant current cannot be supplied. Consequently, the current flowing from the supply line 90 to this circuit varies greatly and the variation of the current produces an adverse effect through the power supply to other circuits, not shown.

The output clipping transistor 97 prevents the occurrence of such a condition. A fixed voltage is applied through the clipping voltage terminal 92 to the gate of the transistor 97. A current flows through the output clipping transistor 97 when the potential of the MOSFET 100 increases beyond a fixed value to stop the increase of the potential of the MOSFET 100. Consequently, the saturation of the MOSFET 99 is maintained to supply a constant current continuously.

Figure 12:
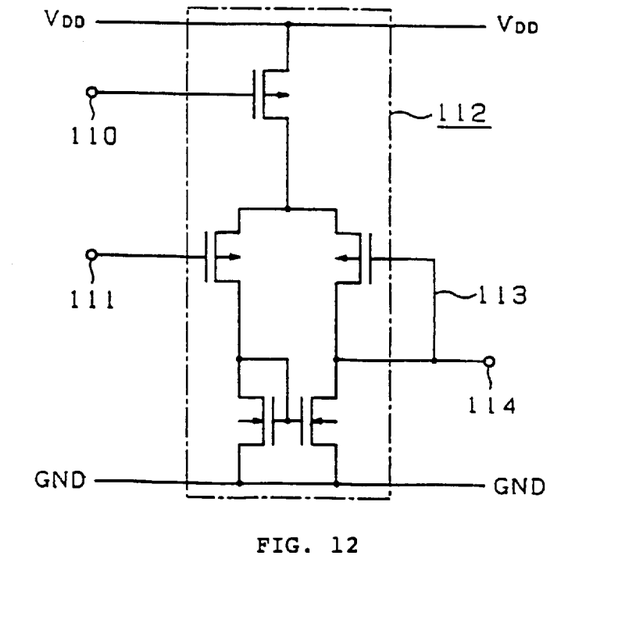
FIG. 12 is a concrete circuit diagram of a second-stage amplifier included in the dual sample-and-hold circuit of FIG. 10.

FIG. 12 is a concrete circuit diagram of a second amplifying stage (operational amplifier 75 (76)) of the dual sample-and-hold circuit. Shown in FIG. 12 are a constant-current control signal input terminal 110, an input terminal 111, a differential amplifier 112, a negative feedback circuit 113 and an output terminal 114. The second amplifying stage comprises only one differential amplifier and functions as a buffer when the negative feedback circuit 113 is short-circuited.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A signal processor comprising:
    a dual correlation sampling circuit; and
    a sample-and-hold circuit connected to the output part of the dual correlation sampling circuit;
    said dual correlation sampling circuit comprising:
        an amplifying stage to which an input signal is given;
        a low-pass filter connected to the output part of the amplifying stage;
        a time constant changing switch to be closed to set the low-pass filter for a smaller time constant; and
        a switch driving means for closing the time constant changing switch after the completion of giving an input signal to the amplifying stage.

2. The signal processor according to claim 1, wherein the switch driving means closes the time constant changing switch upon the completion of application of a picture signal to the amplifying stage, and opens the time constant changing switch after the passage of a time in which the output of the low-pass filter stabilizes substantially, and the sample-and-hold circuit samples the output of the dual correlation sampling circuit after the time constant changing switch has been closed.

3. The signal processor according to claim 1, wherein the sample-and-hold circuit samples the output of the dual correlation sampling circuit a time equal to or longer than a time constant available while the low-pass filter is in an on-state after the time constant changing switch has been closed.

4. The signal processor according to claim 1, wherein the low-pass filter comprises a resistor and a capacitor; the time constant changing switch is connected in parallel to the resistor, and the resistor is short-circuited when the time constant changing switch is closed.

5. The signal processor according to claim 1 further comprising an input control means to be driven by the switch driving means to control the application of an input signal to the amplifying stage.

6. A signal processor comprising:
    a dual correlation sampling circuit; and
    a sample-and-hold circuit connected to the output part of the dual correlation sampling circuit;
    said dual correlation sampling circuit comprising:
        an amplifying stage to which an input signal is given;
        an input bias voltage application switch that connects a bias voltage source to and disconnect the same from the input part of the amplifying stage to which an input signal is given;
        a low-pass filter connected to the output part of the amplifying stage and comprising a resistor and a capacitor;
        a cutoff switch interposed between the resistor and the capacitor of the low-pass filter to connect the resistor to and disconnect the same from the capacitor;
        a dc regenerating capacitor having one electrode connected to the junction of the resistor and the cutoff switch;
        a reference power supply connecting switch connected to the other terminal of the dc regenerating capacitor and an output reference power supply; and
        a switch driving means for driving the switches so that the output reference power supply connecting switch is closed to connect the output reference power supply to the dc regenerating capacitor and the cutoff switch is opened to disconnect the resistor from the capacitor when the input bias voltage is applied to the amplifying stage for a first sampling cycle, and the output reference power supply connecting switch is opened and the cutoff switch is closed when a composite signal produced by superposing the input bias voltage and a picture signal is applied to the amplifying stage for a second sampling operation.

7. The signal processor according to claim 6, wherein the switch driving means closes the cutoff switch after opening the output reference power supply connecting switch.

8. The signal processor according to claim 6, wherein the dual correlation sampling circuit has an input reset switch connected to the input part of the amplifying stage and the input bias power source, and switch driving means controls the input reset switch so that the input part of the amplifying stage is connected to the input bias power supply before the first sampling cycle.

9. The signal processor according to claim 6, wherein the switch driving means opens the cutoff switch and the output reference power supply connecting switch when an excessive input that saturates the amplifying stage is given.

10. The signal processor according to claim 6 further comprising an operational amplifier having an input terminal connected to the other electrode of the dc regenerating capacitor connected to the reference power supply connecting switch.

11. A signal processor comprising:
a first operational amplifier having a first input terminal to which an input is applied and a second input terminal;
a first switch for connecting the first input terminal of the first operational amplifier to and disconnecting the same from a reference power supply;
a second switch for connecting the second input terminal of the first operational amplifier to and disconnecting the same from the output terminal of the first operational amplifier;
a first capacitor having an electrode connected to the second input terminal of the operational amplifier and the other electrode connected to the output reference power supply;
a third switch interposed between the first capacitor and the output reference power supply; and
a plurality of sample-and-hold main circuits each comprising a sample-and-hold capacitor and a buffer having an input terminal connected to the sample-and-hold capacitor;
wherein the improvement comprises:
sample-and-hold main circuit selector switches for connecting, when selected, the output terminal of the first operational amplifier to the sample-and-hold capacitors of the plurality of sample-and-hold main circuits, respectively; and
negative feedback switches each for connecting the output terminal of the associated sample-and-hold main circuit to the junction of the first capacitor and the third switch when the associated sample-and-hold main circuit is selected by the sample-and-hold main circuit selector switch.

12. The signal processor according to claim 11 further comprising a second capacitor connected to the output terminal of the first operational amplifier, and the junction of the first capacitor and the third switch.

13. The signal processor according to claim 11, wherein the buffer is an operational amplifier.

14. The signal processor according to claim 11 further comprising a switch driving means for opening the second switch first when opening all the first, the second and the third switch in a closed state.

* * * * *